(12) United States Patent
Wu

(10) Patent No.: US 6,305,948 B1
(45) Date of Patent: Oct. 23, 2001

(54) CONTACT FOR SURFACE MOUNTED CONNECTOR

(75) Inventor: Kun-Tsan Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/563,795

(22) Filed: May 2, 2000

(30) Foreign Application Priority Data

Jan. 20, 2000 (TW) .................................. 89201011

(51) Int. Cl.⁷ .................................................. H01R 12/22
(52) U.S. Cl. .............................................. 439/66; 439/630
(58) Field of Search ...................... 439/66, 630

(56) References Cited

U.S. PATENT DOCUMENTS

| | | | |
|---|---|---|---|
| 5,746,607 | * | 5/1998 | Bricaud et al. ........................ 439/66 |
| 5,879,169 | * | 3/1999 | Wu ........................................ 439/74 |
| 5,980,268 | * | 11/1999 | Mischenko et al. .................... 439/66 |
| 5,980,323 | * | 11/1999 | Bricaud et al. ........................ 439/630 |

* cited by examiner

Primary Examiner—Gary F. Paumen
(74) Attorney, Agent, or Firm—Wei Te Chung

(57) ABSTRACT

An IC card connector comprises an elongate housing and a number of terminals fitted in two rows therein. The housing has a pair of step-shaped sidewalls, a number of passageways ranged along the length of the housing, and a pair of spindles longitudinally extending along the length of the housing and intersecting each passageway. Each terminal includes a base with a mounting surface at a bottom thereof, a fitting tail extending from the base, an annular beam moveably surrounding a corresponding spindle, and a spring beam defining a retaining portion at a free end thereof. Each fitting tail is adjacent and parallel to the base thereby ensuring coplanarity between the mounting surfaces of the plurality of terminals and a circuit board. The annular beams are supported by the spindles thereby positioning the terminals in corresponding passageways, and the retaining portions abut against the sidewalls thereby ensuring uniform normal forces applied by the terminals against an IC card pressed against the connector.

1 Claim, 5 Drawing Sheets

CONTACT FOR SURFACE MOUNTED CONNECTOR

BACKGROUND OF THE INVENTION

1. Field of the Invention

The present invention relates to an IC card connector, and particularly to a contact for an IC card connector which provides a reliable connection with a printed circuit board and a uniform connection force against the IC card.

2. Brief Description of the Prior Art

U.S. Pat. No. 5,879,169, referring to FIG. 5, discloses a connector 10 for connection with an IC card (not shown). The connector 10 consists of an insulative housing 200 and a plurality of contacts 100 disposed in the housing 200. The housing 200 has a plurality of cavities 202 and opposite sidewalls 204. Each contact 100 includes a generally L-shaped beam 103 having an interferential fit with a corresponding sidewall 204, a curved contact portion 104 at one end of the beam 103, and a soldering tail 102 at the other end of the beam 103. The contact portions 104 of the contacts 100 project slightly from a mating surface 206 of the housing 200 for contacting corresponding connecting pads on the IC card. The soldering tails 102 extend outwardly along a bottom surface of each sidewall 204 for being surface mounted on a circuit board. In addition, there is no means for supporting and restraining the contact portions 104, each being a cantilever, whereby the contact portions 104 may protrude beyond the mating surface 206 with uneven heights. Thus, the contact portions 104 exert different normal forces on an IC card situated close and parallel to the mating surface 206 of the connector 10, resulting in an inferior connection therebetween. Surface Mounted Technology (SMT) provides so many advantages that it is ever increasingly utilized in connector manufacturing. Furthermore, it is well known that the coplanarity of the soldering surfaces of the contacts in SMT applications is a critical factor for the quality of the connection. However, the '169 patent provides no means for ensuring the coplanarity such that defective surface soldering between the soldering tails 102 and the circuit board may occur.

Hence, an improved electrical connector is required which is suitable for SMT mounting and which ensures reliable connection with an IC card parallel to the connector's mating surface.

BRIEF SUMMARY OF THE INVENTION

A first object of the present invention is to provide a contact for a surface mounted connector which can be more reliably mounted to a circuit board;

A second object of the present invention is to provide a contact for a surface mounted connector which ensures a uniform normal force applied against an IC card mated thereagainst to establish reliable connection with the IC card.

To achieve the above-mentioned objects, a surface mounted connector of the present invention includes an elongate housing defining a plurality of lateral passageways along its length and a plurality of terminals received in the passageways.

The housing defines a pair of step-shaped sidewalls and forms a pair of spindles. Each spindle longitudinally extends along the length of the housing and intersects each of the passageways. The step-shaped sidewall defines a lower surface and an upper surface at an underside thereof.

Each terminal comprises a base defining a mounting surface at a bottom thereof for mounting the connector to a circuit board, a soldering tail and a bridge separately opposite ends of the base, an annular beam connected between the bridge and a spring beam, the spring beam doubling back toward the base. The terminal is assembled in a corresponding passageway in a manner such that the soldering tail is secured to the lower surface of the sidewall, the annular beam surrounds the spindle, and a retaining portion of the spring beam presses upward against the upper surface of the sidewall.

Since the soldering tail is proximate to the base and it is easy to control the orientation of the soldering tail, which is formed parallel to the base, coplanarity between the mounting surface and a circuit board is so improved that the connector can be reliably mounted to the circuit board. Moreover, the length of the terminal is increased while the normal force provided by the connector against an IC card is uniform because the spindle supports the annular beam of the terminal and the retaining portion is restrained by the upper surface of the sidewall, which together ensures that the normal force exerted by the spring beam on the IC card is even.

Other objects, advantages and novel features of the invention will become more apparent from the following detailed description of the present embodiment when taken in conjunction with the accompanying drawings.

DETAILED DESCRIPTION OF THE INVENTION

Figure 1:
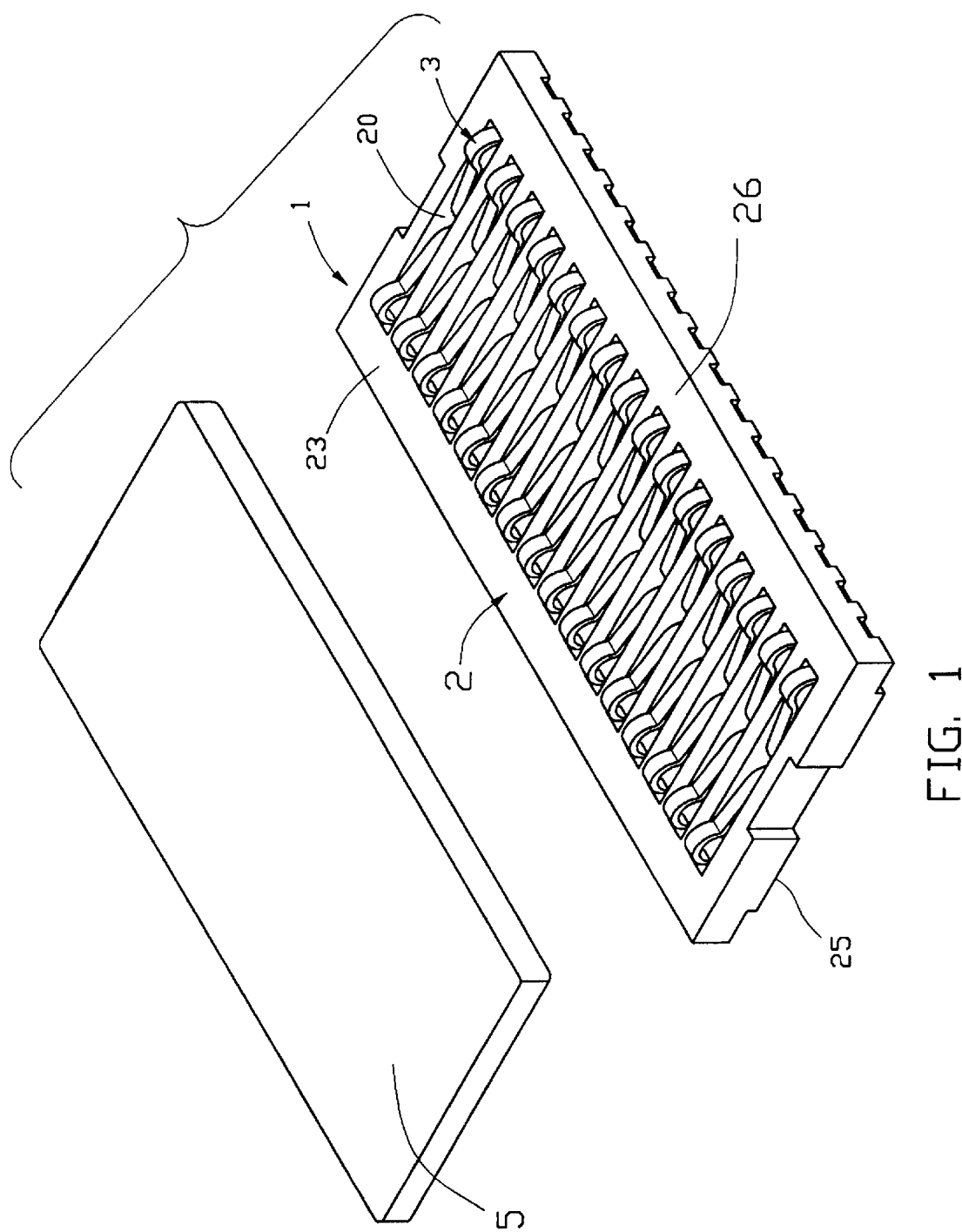
FIG. 1 is a perspective view of an electrical connector in accordance with the present invention.

Referring to FIG. 1, an electrical connector 1 of the present invention, for an electrical connection with an IC card 5, comprises a longitudinal insulative housing 2 and two rows of terminals 3 arranged along the housing 2.

The housing 2 defines a top surface 23, a bottom surface 25 opposite the top surface 23, a pair of sidewalls 26 located at lateral sides thereof, and a plurality of lateral passageways 20 arranged along the length of the housing 2. Further referring to FIG. 4, a pair of positioning spindles 24 longitudinally runs the length of the housing 2 and intersects each of the passageways 20. Each sidewall 26 is step-shaped and so provides at a bottom thereof a lower surface 261 and an upper surface 262.

Figure 4:
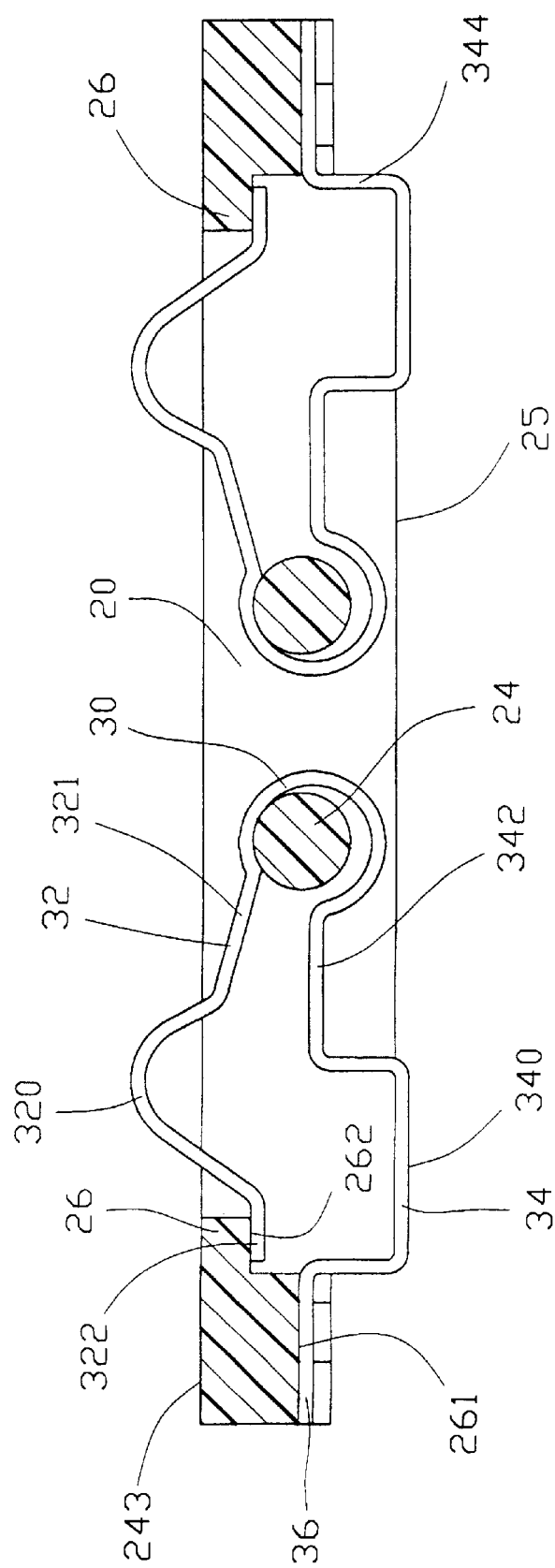
Figure 5:
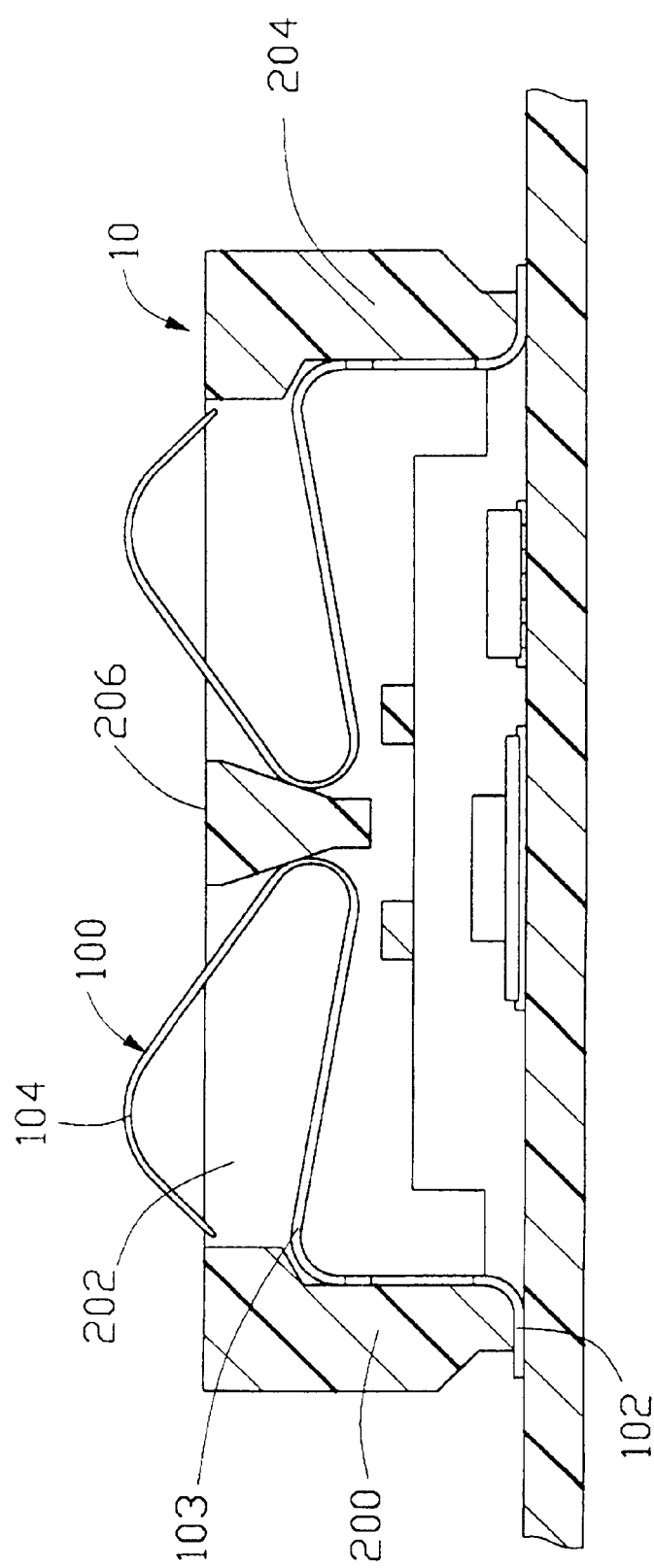
FIG. 5 is a cross-sectional view of a conventional connector.

The terminals 3 are received in corresponding passageways 20 in mirror-image pairs. As shown in FIG. 4, each terminal 3 includes a U-shaped base 34, a fitting tail 36 projecting outwardly from one end of the base 34, a bridge 342 extending inwardly from the other end of the base 34, an annular/curved beam 30 extending from an inward end of the bridge 342, and a spring beam 32 reversedly extending from the annular beam 30 toward the base 34. The base 34 defines a mounting surface 340 at a bottom thereof which slightly protrudes from the bottom surface 25 of the housing 2 for connecting with a circuit board (not shown) by SMT. The bridge 342 and the fitting tail 36 are parallel to the base 34 and are situated a fixed distance above the mounting surface 340 of the base 34. The distance is substantially equal to a distance between the bottom surface 25 of the housing 2 and the lower surface 261 of the sidewall 26. The annular beam 30 surrounds the spindle 24 and has a diameter slightly greater than that of the spindle 24 whereby the annular beam 30 is able to move relative to the spindle 24. The spring beam 32 consists of an inclined portion 321 extending from the annular beam 30, a convex portion 320 arcing upward from an outer end of the inclined portion 321 and projecting beyond the top surface 23, and a retaining portion 322 at a free end thereof. The convex portion 320 projects beyond the top surface 23 of the housing 2 and possesses desirable resiliency with the help of the inclined portion 321. The retaining portion 322 is restrained in its upward movement by the upper surface 262 of the sidewall 26.

The spindles 24 support the annular beams 30 of the terminals 3 whereby the terminals 3 can be precisely positioned in corresponding passageways 20 while the annular beams 30 are held in a sufficient rigid position. Moreover, the retaining portions 322 are biased to press against the upper surface 262 of the sidewall 26 thereby ensuring uniform heights of the convex portions 320 projecting above the top surface 23. Uniform spring forces exerted by the convex portions 320 on the IC card 5 positioned close to and parallel to the top surface 23 of the connector 10 can thus be achieved. Such a design ensures uniform normal forces provided by the terminals 3 for establishing a reliable connection with the IC card 5.

Figure 2:
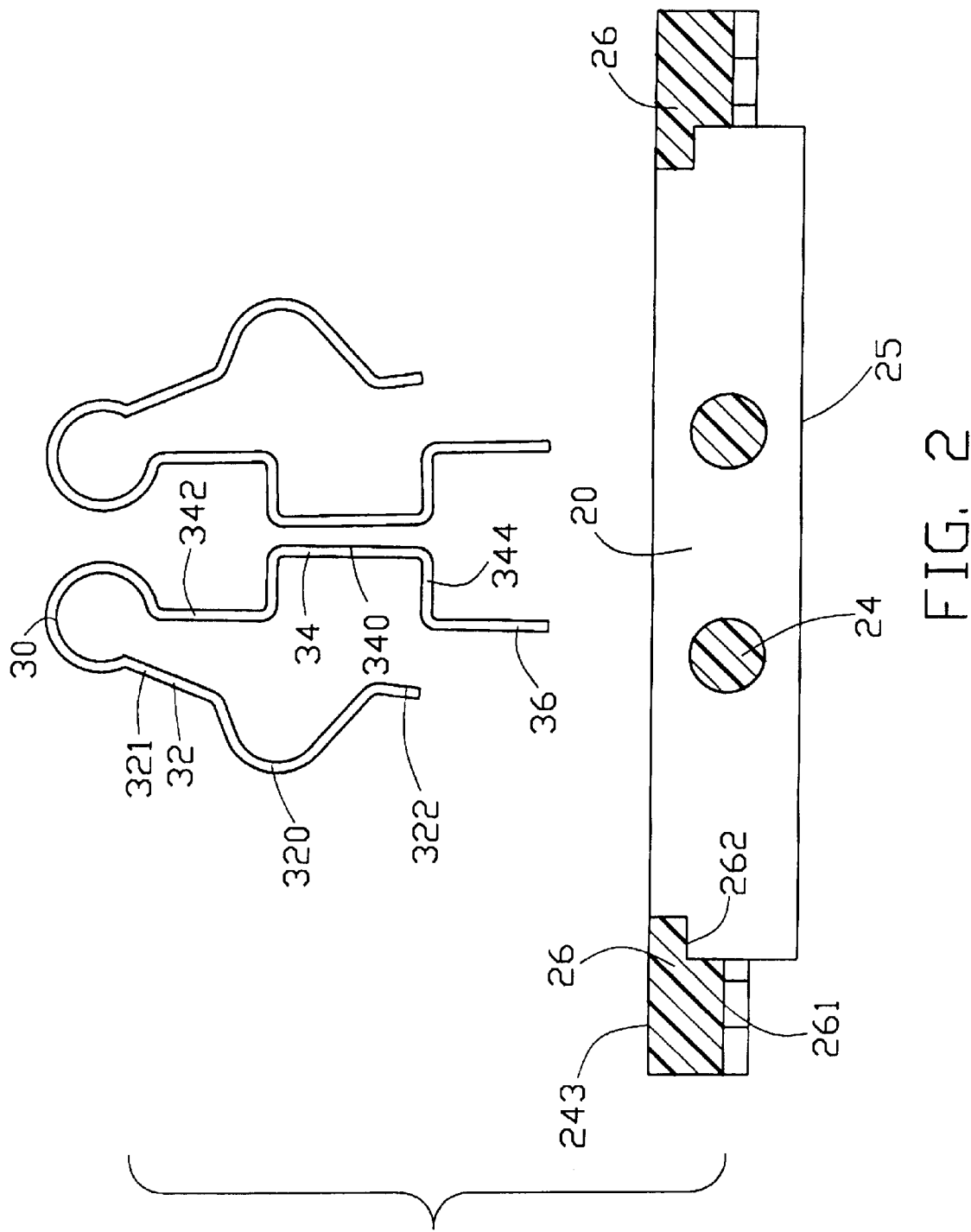
FIGS. 2, 3 and 4 are cross-sectional views showing steps for mounting terminals to a housing of the electrical connector of FIG. 1.
Figure 3:
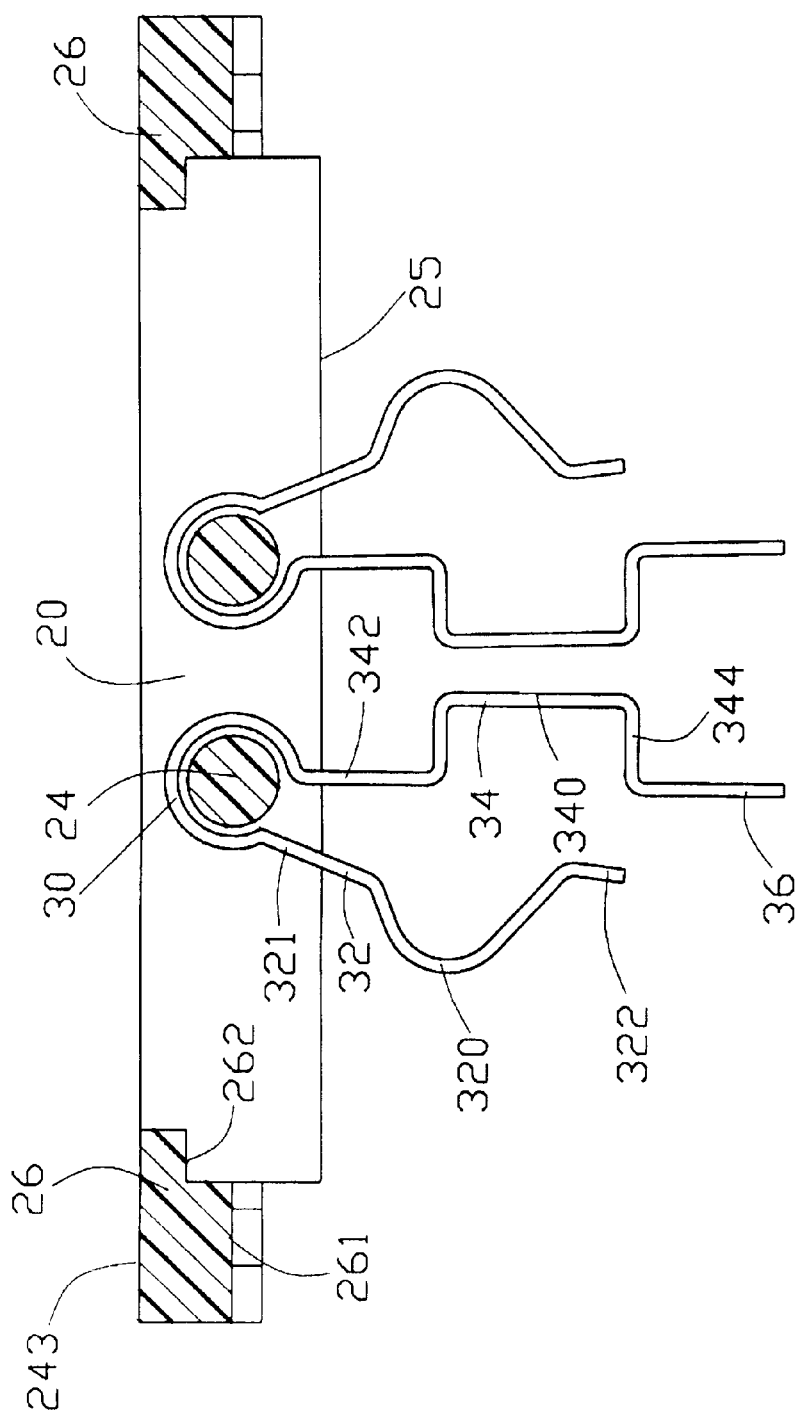

In assembly, referring to FIGS. 2, 3 and 4, each terminal 3 is inserted downwardly into the passageway 20 in a way that the fitting tail 36 and the spring beam 32 slide along opposite sides of the spindle 24 until the annular portion 30 surrounds the spindle 24. Then, the terminal 3 rotates about the spindle 24 with the spring beam 32 pivoting about the spindle 24 so that the retaining portion 322 abuts against the upper surface 262 of the sidewall 26 and the fitting tail 36 encountering the lower surface 261 of the sidewall 26. The fitting tail 36 is then secured to the lower surface 261 by melting the lower surface 261 of the sidewall 26 or by subjecting the lower surface 261 to, for example, ultrasonic fusion thereby fixing the terminal 3 in the passageway 20 of the housing 2. Finally, the mounting surfaces 340 of the terminals 3 of the connector 1 are surface mounted to the circuit board (not shown). As stated above, the fitting tails 36 are adjacent and parallel to the bases 34 and are fixed in position whereby coplanarity of the mounting surfaces 340 of the bases 34 is easily improved, thereby providing high quality soldering connections when soldering the connector 1 to the circuit board (not shown).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector for connecting a printed circuit board with an IC card, comprising:

an insulative housing having a top surface, a bottom surface, a pair of sidewalls, a plurality of passageways arranged along the length of the housing, and a pair of spindles longitudinally extending along the length of the housing and intersecting each passageway; and a plurality of terminals received in corresponding passageways, each terminal including a base slightly protruding below the bottom surface of the housing for being connected to the printed circuit board, a fitting tail projecting from an end of the base and being secured to the sidewall, an annular beam connected to an opposite end of the base and moveably supported by the spindle, and a spring beam extending from the annular beam and protruding from the top surface of the housing for engaging with the IC card, said spring beam having a free end abutting against the sidewall for ensuring uniform normal forces exerted by the terminals against the IC card placed parallel to the top surface of the housing;

wherein the base defines a mounting surface at a bottom thereof for mounting the connector to a circuit board;

wherein the fitting tails are disposed parallel to the bases to ensure the coplanarity between the mounting surfaces and the circuit board;

wherein the spring beam includes an inclined portion connecting to the annular beam, a convex portion extending beyond the top surface of the housing, and a retaining portion located at the free end of the spring beam;

wherein each sidewall is step-shaped and provides a lower surface and an upper surface at a lower end thereof, and wherein the fitting tail is mounted to the lower surface and the retaining portion presses upwardly against the upper surface.

* * * * *